US008024259B1

(12) United States Patent
Wilce et al.

(10) Patent No.: US 8,024,259 B1
(45) Date of Patent: *Sep. 20, 2011

(54) METHOD AND APPARATUS FOR AGREEMENT NETTING

(75) Inventors: Scott Wilce, Morris Plains, NJ (US); Patrick E Harris, New York, NY (US)

(73) Assignee: Goldman Sachs & Co., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/831,749

(22) Filed: Jul. 7, 2010

Related U.S. Application Data

(63) Continuation of application No. 10/045,964, filed on Jan. 14, 2002, now Pat. No. 7,778,914.

(51) Int. Cl.
*G06Q 40/00* (2006.01)
(52) U.S. Cl. .......................... 705/37; 705/39
(58) Field of Classification Search .............. 705/37, 705/39
See application file for complete search history.

(56) References Cited

U.S. PATENT DOCUMENTS

| | | | | |
|---|---|---|---|---|
| 5,774,553 A * | 6/1998 | Rosen | | 705/68 |
| 6,076,074 A * | 6/2000 | Cotton et al. | | 705/40 |
| 6,304,858 B1 * | 10/2001 | Mosler et al. | | 705/37 |
| 7,024,386 B1 * | 4/2006 | Mills et al. | | 705/37 |
| 7,149,720 B2 * | 12/2006 | Shepherd | | 705/37 |
| 7,577,601 B1 * | 8/2009 | Rademacher et al. | | 705/36 R |
| 7,580,872 B2 * | 8/2009 | Van Slyke et al. | | 705/35 |
| 2002/0099641 A1 * | 7/2002 | Mills et al. | | 705/37 |
| 2002/0152147 A1 * | 10/2002 | Shulman et al. | | 705/35 |
| 2004/0024692 A1 * | 2/2004 | Turbeville et al. | | 705/38 |

OTHER PUBLICATIONS

Bank for International Settlements: Report of Committee on InterBank Netting Schemes of Central Banks of the Group of Ten countries. Nov. 1990, pp. 1-40.*
Kahn et al.: Settlement risk under gross and net settlement, Aug. 1999, Federal Reserve Bank of Atlanta, Atlalnta, pp. 1-34.*
Bergman et al.: Netting, Financial Contracts, and Banks: The Economic Implications, Aug. 2003, Research in Financial Services, pp. 1-38.*
Malloy et al.: Netting of derivatives contracts in the spotlight in Congress and at Enron, Apr. 2002, MFA Reporter, Managed Funds Association, pp. 1-3.*

* cited by examiner

*Primary Examiner* — Bijendra K Shrestha
(74) *Attorney, Agent, or Firm* — John A. Squires; Chadbourne & Parke LLP

(57) ABSTRACT

A system, method, apparatus, computer program code and means for performing a netting analysis of an agreement is provided. Pursuant to some embodiments, the netting analysis is performed by receiving agreement information, the agreement information identifying a party and a counterparty. The agreement information is compared with a netting rule. A netting determination for the agreement is generated based at least in part on a result of the comparing.

15 Claims, 9 Drawing Sheets

600

| RULE ID 602 | DESCRIPTION 604 | RULE 606 |
|---|---|---|
| 001 | Industry Code (Italian) | IF SIC=Italian Industry Code THEN Conclusion = "2:YES: Reasonable Assurance" |
| 002 | Form of Agreement (IFEMA) | IF Form of Agreement =IFEMA THEN Conclusion= "3=YES: High Confidence" |
| 003 | Governing Law (English) | IF Governing Law=ENGLISH THEN Conclusion= "3:YES: High Confidence" |

| FACT ID 504 | DESCRIPTION 506 | VALUE 508 |
|---|---|---|
| 001 | FORM OF AGREEMENT | JA: IFEMA (Int'l Foreign Exchange Master Agreement) |
| 002 | GOVERNING LAW | ENGLISH |
| 003 | COUNTRY OF ORGANIZATION | ITALY |
| 004 | STATE OR PROVINCE OF ORGANIZATION | UNKNOWN |
| 005 | LEGAL STRUCTURE | SOCIETA PER AZIONI (S.p.A.) |
| 006 | SIC CODE | SECURITY & COMMOD BRK/DEALERS |
| 007 | AUTOMATIC EARLY TERMINATION LANGUAGE | N |
| 008 | GOLDMAN SACHS ENTITY | (GS) GOLDMAN SACHS INTERNATIONAL FINANCE |
| 009 | COUNTER PARTY NAME | BANCA AKROS SPA |
| 010 | PARENT COMPANY COUNTRY OF ORGANIZATION | ITALY |
| 011 | PARENT COMPANY LEGAL STRUCTURE | BANK |

AGREEMENT IDENTIFIER: A0001   502

| RULE ID 602 | DESCRIPTION 604 | RULE 606 |
|---|---|---|
| 001 | Industry Code (Italian) | IF SIC=Italian Industry Code THEN Conclusion = "2:YES: Reasonable Assurance" |
| 002 | Form of Agreement (IFEMA) | IF Form of Agreement =IFEMA THEN Conclusion= "3=YES: High Confidence" |
| 003 | Governing Law (English) | IF Governing Law=ENGLISH THEN Conclusion= "3:YES: High Confidence" |

| AGREEMENT IDENTIFIER: A0001 702 ||||||
|---|---|---|---|---|---|
| SEQUENCE ID 704 | ISSUE NUMBER 706 | ISSUE DESCRIPTION 708 | CAN PARTIES NET FOR THIS ISSUE? 710 | END? 712 | RULE 714 | COMMENTS 716 |
| T001 | 001 | Does the form of agreement contain acceptable netting language? | 3=YES: High Confidence | NO | 11 | OK |
| T002 | 002 | Does the governing law support netting in the case of default? | 3=YES: High Confidence | NO | 195 | OK |
| T003 | 003 | Does the law of the cp's home country allow for netting in insolvency? | 3=YES: High Confidence | NO | 227 | OK |
| T004 | 008 | Italy: Italian Legal Structure | 3=YES: High Confidence | NO | 547 | OK |
| T005 | 014 | Italy: Italian Industry Code | 2=YES: Reasonable Assurance | YES | 324 | OK |

METHOD AND APPARATUS FOR AGREEMENT NETTING

This application is a continuation of and hereby claims priority under 35 U.S.C. 120 to non-provisional U.S. patent application Ser. No. 10/045,964, entitled "Method And Apparatus For Agreement Netting," filed on Jan. 14, 2002. The entire contents of the aforementioned application is herein expressly incorporated by reference.

FIELD OF THE INVENTION

The present invention relates to legal agreements. More particularly, embodiments of the present invention relate to methods and apparatus for agreement netting.

BACKGROUND OF THE INVENTION

The financial and legal world is quite complex. Cross-border financial transactions among entities are commonplace, resulting in entities having multiple financial exposures with others around the world. This can be difficult to manage and can lead to many problems. For example, a financial institution may have large intra-day foreign exchange settlement obligations with a number of different trading partners. A large financial institution may have millions of dollars of exposure to their largest counterparties on any given day. Entities may also have large exposures based on counterparty credit risk and liquidity risk. Many entities enter into agreements to manage and control these exposures.

When trading partners agree to offset their positions or obligations, they are "netting". By doing so, they reduce a large number of individual positions or obligations to a smaller number of positions or obligations, and it is on this netted position that the two trading partners settle their outstanding obligations. Besides reducing transaction costs and communication expenses, netting is important because it reduces credit and liquidity risks, and ultimately systemic risk.

Netting agreements have been used to manage these exposures in a number of different contexts. Netting agreements are a contractual mechanism to offset payables against receivables to reduce an entity's exposure to a counterparty. Netting agreements are used, for example, to reduce credit exposure to the net obligation of a counterparty. The enforceability and use of netting agreements varies by jurisdiction. For example, in the United States, netting in bankruptcy or insolvency is enforceable under the federal bankruptcy code. Netting between United States-based counterparties is permitted by the Financial Institutions Reform, Recovery, and Enforcement Act of 1989 (FIRREA). Different jurisdictions have different rules and laws regarding the use and enforceability of netting agreements. This can make it quite difficult for an entity to manage credit and exchange risk with any certainty. Frequently, an opinion of counsel regarding the legality of a particular netting relationship is required for each jurisdiction, and often for each netting agreement.

It would be desirable to provide a system which allows the analysis of netting agreements. It would further be desirable to provide a system which allows the automated analysis of netting agreements. It would further be desirable to provide a system which allows a number of issues associated with agreements to be analyzed based on the particular fact pattern of each agreement. It would further be desirable to provide a system which allows the analysis of agreements and which allows updating of netting positions between parties.

SUMMARY OF THE INVENTION

Embodiments of the present invention provide a system, method, apparatus, computer program code and means for performing a netting analysis of an agreement. Pursuant to some embodiments, the netting analysis is performed by receiving agreement information, the agreement information identifying a party and a counterparty. The agreement information is compared with a netting rule. A netting determination for the agreement is generated based at least in part on a result of the comparing.

According to some embodiments, this netting analysis is performed for multiple issues associated with the agreement. According to some embodiments, a list of default issues is identified and are analyzed. According to some embodiments, each issue is associated with a set of facts which are associated with one or more rules. Each rule is applied to one or more facts of each agreement to arrive at a netting determination for an issue.

According to some embodiments, agreement information is retrieved from a counterparty system. According to some embodiments, netting determinations are forwarded to systems including counterparty agreement database systems, credit systems and Financial Accounting Standards Board (FASB) systems. According to some embodiments, net positions between a contracting entity and a counterparty are traced based on the outcome of netting determinations.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

FIG. 5 is a tabular representation of a portion of a fact database according to an embodiment of the present invention;

FIG. 7 is a tabular representation of a portion of an issue database according to an embodiment of the present invention;

DETAILED DESCRIPTION

Applicants have recognized that there is a need for a system, method, apparatus, and computer program code for agreement netting which overcomes deficiencies in existing systems. For example, Applicants have recognized that there is a need for a system, method, apparatus and computer program code for agreement netting which allows an entity to efficiently arrive at netting determinations and to efficiently and accurately manage and update netting agreements and netting positions. Applicants have further recognized that there is a need for such netting determinations to be performed in an accurate, timely and repeatable fashion.

Applicants have further recognized the need for a system that could provide levels of confidence in the determined netting decision based upon an analysis of the agreements (e.g. high-confidence, reasonable assurance, etc); the need for a system that could be trained to make netting determinations based upon the introduction of new issues and rules into the system; and the need for a system that recognizes new (or previously unconsidered agreement information) during agreement analysis and which adapts to this new information such that subsequent netting decisions can be based upon the information.

System Overview

Figure 1:
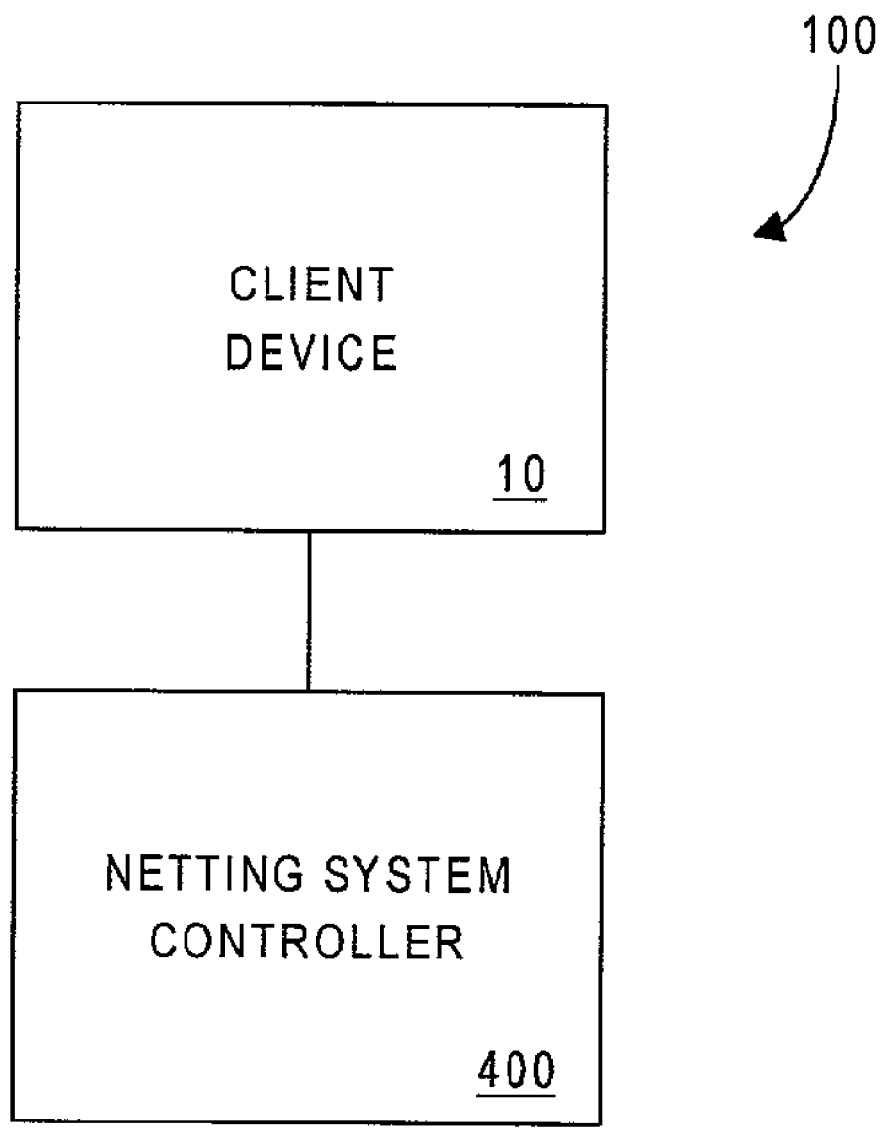
FIG. 1 is a block diagram overview of an agreement netting system according to an embodiment of the present invention.

Reference is now made to the drawings, beginning at FIG. 1, where a block diagram of an agreement netting system 100 according to an embodiment of the present invention is shown. As depicted in FIG. 1, agreement netting system 100 includes a netting system controller 400 in communication with a client device 10. For example, a user may input information associated with netting issues and rules that influence netting determinations via client device 10. Client device 10 may then transmit this information to netting system controller 400, which in turn may store or otherwise utilize the information in a manner which allows netting system controller 400 to apply netting rules to arrive at netting determinations.

These netting determinations may be made on information received from a number of different sources. For example, netting agreement information may be input by a user via client device 10, or it may be communicated to netting system controller 400 from other sources (e.g., such as other repositories or sources of legal agreements, as will be described further infra). Netting determinations made by netting system controller 400 may be presented to a user operating client device 10 or they may be output to other systems in communication with netting system controller 400 as will be described further below.

Agreement netting system 100 may be operated by, or on behalf of, an entity or entities which are parties to multiple contracts between multiple counterparties. For example, agreement netting system 100 may be operated by, or on behalf of, a financial institution which enters into multiple contracts with counterparties, each having different credit or FASB terms. Agreement netting system 100 may be operated by or on behalf of any entity which desires an ability to net positions for agreements with one or more counterparties.

Figure 2:
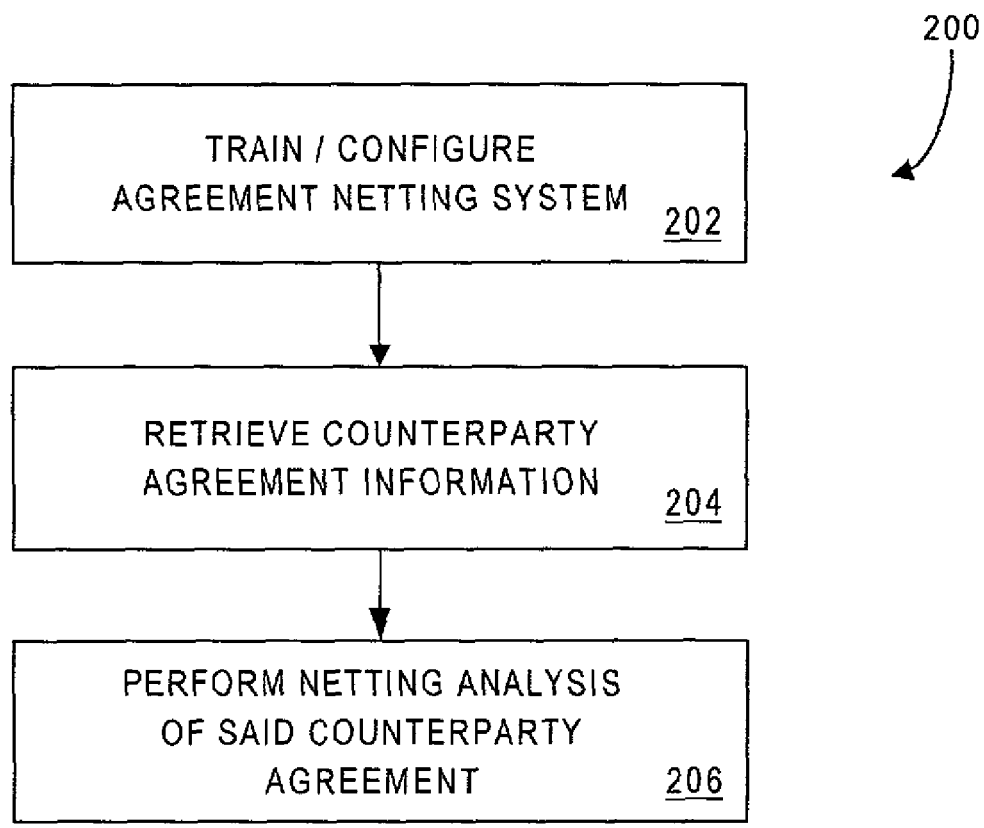
FIG. 2 is a flow chart of a method according to some embodiments of the present invention.

Referring now to FIG. 2, a flow chart of a process for agreement netting 200 is shown. The flow chart in FIG. 2 and the flow charts in other figures described herein do not imply a fixed order to the steps, and embodiments of the present invention can be practiced in any order that is practicable. The process shown in FIG. 2 may be performed, for example, by agreement netting system controller 400.

Process 200 begins at 202 where a netting decision engine is trained. In some embodiments, netting system controller 400 stores program code and data which functions as a netting decision engine. This netting decision engine may be configured in any of a number of different ways so long as it may apply netting issues and rules to netting agreement facts to arrive at netting determinations. Processing at 202 may involve repeated interaction by users operating client device 10 to forward netting issues and rules to netting system controller 400. This training process may be performed on a regular basis to ensure that netting system controller 400 contains current rules and issues and produces accurate and repeatable netting determinations. In some embodiments, each agreement has a number of facts associated with it. In some embodiments, a predetermined set of different types of facts to be analyzed for netting determinations is established by a system operator or user. In some embodiments, a number of issues are identified which are associated with each fact set. A number of rules are established which are used to evaluate different fact patterns. These rules are established by training the netting decision engine.

Once the netting decision engine has been trained or otherwise configured such that accurate and repeatable netting determinations may be rendered, processing continues at 204 where counterparty agreement information is received. In some embodiments, this information is received by netting system controller 400 from a user operating client device 10. In some embodiments, this information is received from other data sources in communication with netting system controller 400. For example, in some embodiments, netting system controller 400 is in communication with one or more repositories of legal agreements. These agreements may be retrieved by, or forwarded to, netting system controller 400 to render netting determinations on each of the agreements, or on a designated group or other selection of agreements.

Processing continues at 206 where a netting analysis is performed on the counterparty agreement information received at 204. For example, an agreement may be analyzed by comparing information in the agreement ("facts") to rules and issues maintained in netting system controller 400 to arrive at a netting determination for a particular counterparty agreement. The netting determination rendered at 206 may include a number of netting determinations for various aspects of an agreement (e.g., a netting determination may be rendered for each issue posed by facts of the agreement). An overall netting determination (e.g., either approved "Yes" or disapproved "No") may also be rendered for an agreement. In some embodiments, grades of netting determinations may be rendered such as, for example, "Yes: HIGH CONFIDENCE", "Yes: REASONABLE ASSURANCE", "No: WITH RESEARCH", "No: INSUFFICIENT RESEARCH", No: NEW RULE, MUST EVALUATE", or the like. Each grade may result in the need to perform subsequent remedial, follow-up or investigatory action. Further, levels of confidence may be attached to netting determinations which indicate the relative enforceability of the netting determination, in addition to a qualification of the result. Levels of confidence may also be used to provide an indication of a required follow-up action.

This netting determination may be presented to a user operating client device 10, or in some embodiments, it may be used to update information about the agreement. Further, in some embodiments, results of the netting determination may be used to update financial information in other systems to reflect a netting position resulting from the analyzed netting agreement. Other features of embodiments of the present invention will become apparent based on the following discussion.

System Architecture

Figure 3:
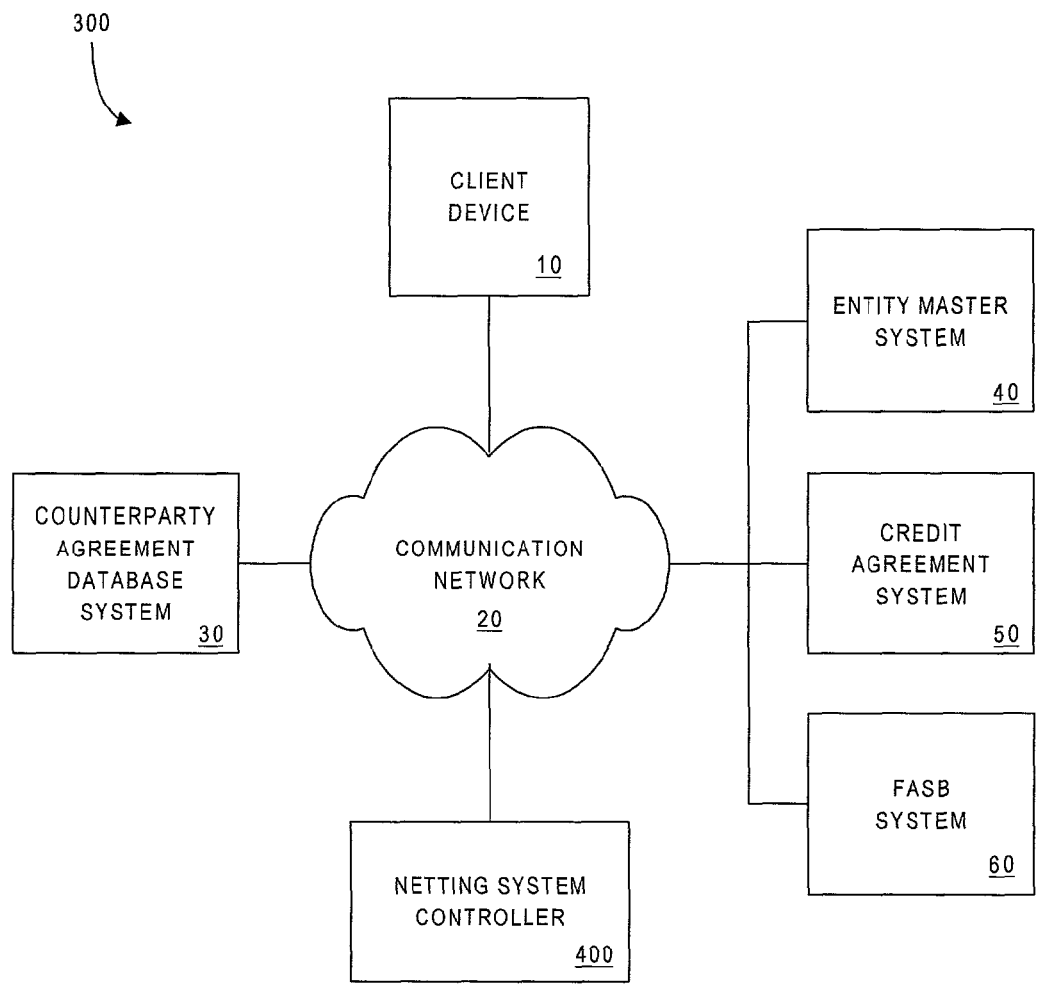
FIG. 3 is a block diagram overview of an agreement netting system according to some embodiments of the present invention.

FIG. 3 is a block diagram overview of an agreement netting system 300 according to another embodiment of the present invention. As in FIG. 1, netting system controller 400 is in communication with client device 10. Further, netting system controller 400 is in communication with additional devices or systems, such as one or more counterparty agreement database systems 30, entity master systems 40, credit agreement systems 50, and FASB systems 60.

As used herein, devices (such as netting system controller 400, client device 10, counterparty agreement database system 30, entity master system 40, credit agreement system 50, and FASB system 60) may communicate via a communication network 20, such as a Local Area Network (LAN), a Metropolitan Area Network (MAN), a Wide Area Network (WAN), a proprietary network, a Public Switched Telephone Network (PSTN), a Wireless Application Protocol (WAP) network, a wireless LAN (e.g., in accordance with the Institute of Electrical and Electronics Engineers 802.11 standard), a Bluetooth network, an Infrared Radiation (IR) network, and/or an IP network such as the Internet, an intranet or an extranet. As used herein, the term "communications" can refer to wired and/or wireless communications as appropriate. Note that the devices shown in FIG. 3 need not be in constant communication. For example, netting system controller 400 may communicate with a client device 10 on an as-needed or periodic basis.

Although a single netting system controller 400 is shown in FIG. 3, any number of controllers 400 may be included in agreement netting system 300. Similarly, any number of client devices 10, or any other device described herein, may be included in the system 300 according to embodiments of the present invention.

Netting system controller 400, client devices 10, and other devices such as devices 30, 40 and 50 may be any devices capable of performing the various functions described herein. Client device 10 may be, for example: a Personal Computer (PC), a portable computing device (e.g., a laptop computer), a Personal Digital Assistant (PDA), or a dedicated agreement netting system 300 terminal. Note that the client device 10 may be associated with a full-blown workstation application or a thin-client browser-based application. In one example environment, a business may utilize features of embodiments of the present invention over a corporate intranet, allowing access to individual employees operating personal computers configured as client devices 10. In this manner, a large number of users may access and store agreement netting information using the system.

According to some embodiments, client device 10 may, for example, control user functionality (e.g., by supporting applicable user interactions). Client device 10 may also perform session management (e.g., by providing user login and logout capability, managing a physical connection including a connection status notification to a user, and issuing a logout when appropriate). In some embodiments, client device 10 may be operated as a system administrator device enjoying greater system privileges than a standard user device. Those skilled in the art will recognize that a variety of different access and control privileges may be granted to different users accessing agreement netting information via system 300.

According to some embodiments, a user may enter information such as netting information rules, issues, opinions, guidance, or the like, to configure the netting system. This information is utilized by netting system controller 400 to arrive at netting determinations about counterparty agreements analyzed by the controller 400. In some embodiments, a user (e.g., such as a lawyer, a group of lawyers, or other individual(s) responsible for training and configuring netting system controller 400) inputs this information to controller 400 via client device 10 on a regular basis to ensure the system is up-to-date with accurate and useful netting information. In some embodiments, users may periodically update the information to ensure that the system is able to accurately generate netting determinations.

According to some embodiments, a user operating client device 10 may instruct netting system controller 400 to perform a netting analysis on one or more counterparty agreements. In some embodiments, netting system controller 400 may be directed to perform a netting analysis on agreements which are stored and maintained by other systems in communication with netting system controller 400 via communication network 20. For example, counterparty agreement database system 30 may store all counterparty agreements entered into by a business. Netting system controller 400 may, e.g., perform a netting analysis on all agreements in counterparty agreement database system 30 which have not previously been analyzed for netting purposes. This analysis may be triggered by inputs from a user operating client device 10, or the analysis may be a batch analysis performed on a periodic basis. In this manner, all counterparty agreements entered into by the business entity may be analyzed in a timely and accurate fashion.

According to some embodiments, the netting analysis performed by netting system controller 400 includes comparing agreement information with netting rules stored at, or accessible to, controller 400. In some embodiments, the netting analysis includes identifying facts associated with the counterparty agreement to be analyzed, identifying issues based on the facts, and applying rules to the facts to arrive at a netting determination. In some embodiments (e.g., after the system has been trained) no manual intervention is required to arrive at a netting determination.

According to some embodiments, the results of the netting analysis performed by netting system controller 400 may be provided to a user operating client device 10 or to other systems. For example, in embodiments using a separate counterparty agreement database system 30, netting determination information may be communicated to the counterparty agreement database system 30. The results of the netting analysis may also be used to update netting information stored in systems which maintain information about netting positions, such as credit systems which reflect a netting position for each counterparty and for the business entity as a whole.

Note that netting system controller 400 may communicate with client device 10, counterparty agreement database system 30, entity master system 40, credit agreement system 50, and FASB system 60 via a single communication network 20 or via different communication networks. Netting system controller 400 may communicate via different networks with other devices as well, such as with other systems such as document generation systems, imaging systems, archive systems, or the like.

Figure 4:
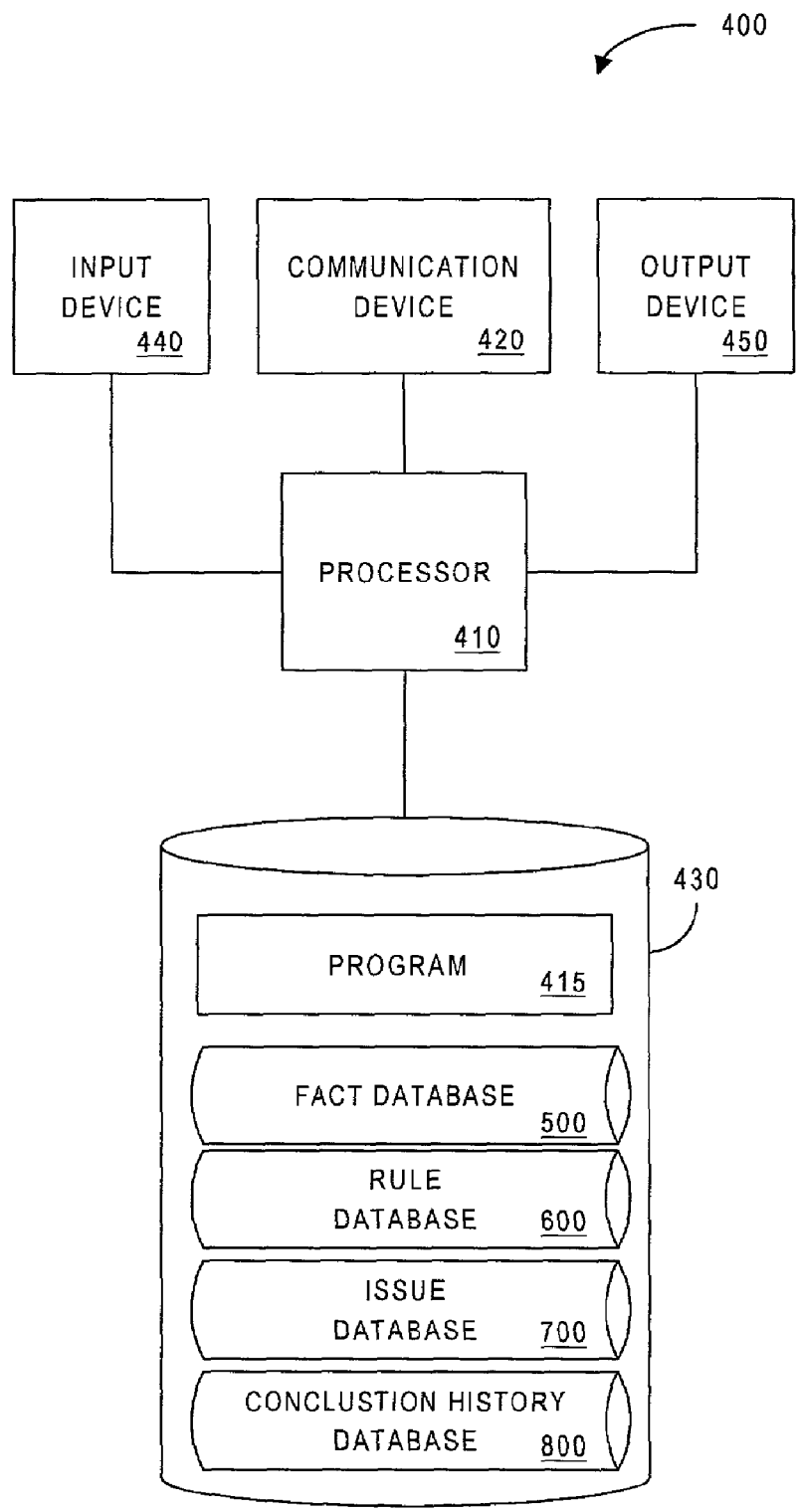
FIG. 4 is a block diagram of an agreement netting system controller according to some embodiments of the present invention.

Referring now to FIG. 4, a more detailed view of netting system controller 400 is shown that is descriptive of the devices shown, for example, in FIGS. 1 and 3 according to some embodiments of the present invention. Netting system controller 400 comprises a processor 410, such as one or more INTEL® Pentium® processors, coupled to a communication device 420 configured to communicate via a communication network (not shown in FIG. 4). Communication device 420 may be used to communicate, for example, with one or more client devices 10 and/or satellite devices (such as systems 30, 40 and 50). In some embodiments, communication device 420 is used to communicate with one or more counterparty agreement database systems 30 to retrieve counterparty agreement information for analysis. Communication device 420 may also be used to forward netting determinations to counterparty agreement database system 30 and to other systems in communication with controller 400.

Processor 410 is also in communication with an input device 440. Input device 440 may comprise, for example, a keyboard, a mouse or other pointing device, a microphone, knob or a switch, an IR port, a docking station, and/or a touch screen. Input device 440 may be used, for example, to enter information (e.g., information identifying a document to be stored or retrieved).

Processor 410 is also in communication with an output device 450. Output device 450 may comprise, for example, a display (e.g., a display screen), a speaker, and/or a printer. Output device 450 may be used, for example, to output information about a document to be stored or retrieved from the data storage and retrieval system.

Processor 410 is also in communication with a storage device 430. Storage device 430 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

Storage device 430 stores one or more programs 415 for controlling processor 410. Processor 410 performs instructions of program 415, and thereby operates in accordance with the present invention. For example, processor 410 may receive netting rules, issues, opinions, data and other information which are provided to "train" the program to perform netting analyses. In some embodiments, program 415 may be a rule-based engine which applies netting rules to facts and issues identified based on information received regarding counterparty agreements. In some embodiments, program 415 may be configured as a neural-network or other type of program using techniques known to those skilled in the art to achieve the functionality described herein.

Storage device 430 also stores databases, including, for example, a fact database 500, a rule database 600, an issue database 700, and a conclusion history database 800. These databases are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information only; those skilled in the art will understand that the number and content of the entries can be different from those illustrated herein.

Databases

Referring now to FIG. 5, a table represents a fact database 500 that may be stored at (or accessible by) netting system controller 400. The table includes entries identifying a number of different facts retrieved from counterparty agreements for which a netting determination is desired. These facts may be retrieved from external systems (such as, for example, counterparty agreement database system 30) or they may be input by a user operating client device 10.

The table also defines fields 502-508 for each of the entries. The fields specify: an agreement identifier 502, a fact identifier 504, a description 506, and a value 508. The information in fact database 500 may be created and updated, for example, based on information received from a user operating client device 10 and/or based on information retrieved from other systems such as counterparty agreement database system 30. For example, a user, such as a lawyer or administrator, may enter information defining a listing of facts and fact descriptions which are to be retrieved from agreements. Controller 400 may then retrieve counterparty agreement information from counterparty agreement database system 30 to perform netting analyses of agreements contained in system 30. Fact information used to populate fact database 500 may be retrieved at that time.

Agreement identifier 502 may include information identifying a particular counterparty agreement which is being analyzed. For example, alphanumeric or other data may be used to uniquely identify and track each counterparty agreement. This identifier may be the same as, or related to, identifiers used by other systems (such as, for example, the counterparty agreement database system 30). As depicted in FIG. 5, the counterparty agreement which is being analyzed is identified by agreement identifier "A0001".

Fact identifier 504 may include information identifying a particular type of fact retrieved from the agreement identified by agreement identifier 502. In some embodiments, a preferred set of types of facts is defined. Each counterparty agreement for which a netting determination is desired is analyzed to identify these particular facts. As shown in FIG. 5, twelve different types of facts are retrieved from each agreement to make a netting determination, including facts such as: the "FORM OF AGREEMENT", "GOVERNING LAW", and the like. Applicants have found that this set of facts is useful in arriving at repeatable and accurate netting determinations. Those skilled in the art will recognize that other types of facts may also be used to perform analyses using features of embodiments of the present invention.

Fact description 506 may include information which describes the fact identified by fact identifier 504. Fact description 506 may be used, for example, to provide a human-readable and understandable description of desired facts.

Value 508 may include fact information retrieved from the counterparty agreement identified by agreement identifier 502 which is associated with the type of fact identified by fact identifier 504. For example, as depicted in FIG. 5, controller 400 has determined that agreement identifier "A0001" has a "FORM OF AGREEMENT" of "JA: IFEMA (Int'l Foreign Exchange Master Agreement)". That is, a fact associated with agreement identifier "A0001" is that the agreement is an International Foreign Exchange Master Agreement. Other facts associated with agreement identifier "A0001" is that the agreement is governed by "ENGLISH" law, does not include "AUTOMATIC EARLY TERMINATION LANGUAGE", and is between "GOLDMAN SACHS INTERNATIONAL FINANCE" and "BANCA AKROS SPA". These facts may be retrieved from counterparty agreements during a netting analysis pursuant to embodiments of the present invention. Other facts and information may also be retrieved to provide a basis for a netting analysis of counterparty agreements.

Figure 6:
FIG. 6 is a tabular representation of a portion of a rule database according to an embodiment of the present invention.

Referring now to FIG. 6, a table represents a rule database 600 that may be stored at (or accessible by) netting system controller 400. The table includes entries identifying a number of different rules which have been established for the netting system which are applied to facts associated with counterparty agreements to be analyzed by the system. These rules may be established and maintained by a user (such as lawyers and/or system administrators) to ensure that netting analyses performed by the system are accurate, repeatable, and based on current laws.

The rules used by netting system 300 may be established in a number of ways. In one embodiment, the rules are established as the system is trained. For example, a set of rules may be initially established by identifying rules that commonly occur in netting determinations. This set of rules may be stored, for example, in rule database 600, and used to make netting determinations for counterparty agreements. As new facts are identified (e.g., through the processing of different counterparty agreements having new fact patterns affecting netting determinations), a user of the system is prompted to create a new rule to evaluate the new fact pattern.

The table shown in FIG. 6 defines fields 602-606 for each entry. In some embodiments, the fields specify a rule identifier 602, a description 604, and a rule 606. Several example entries for each rule are depicted in the example table of FIG. 6. Those skilled in the art will recognize that a large number of rules may be generated and stored in a database such as rule database 600 (e.g., a different rule may be established for each different value of fact encountered in counterparty agreements analyzed by the system).

Rule identifier 602 may include alphanumeric data or other information used to specifically identify a particular rule established and used in system 300. Description 604 may include information used to describe the particular rule identified by rule identifier 602. Rule 606 may include information defining a particular rule. A rule may be defined in any of a number of different ways. For example, a rule may operate on a particular fact or on several different facts. As one example, when training system 300, a user (e.g., such as a lawyer or other operator), may determine that there is a high confidence that agreements of the type "IFEMA" can be netted (i.e., agreements having the fact "Form of Agreement" equal to the value "IFEMA"). Accordingly, the user may establish a rule (such as rule identifier "002" in rule database 600) indicating that "IF Form of Agreement="IFEMA" THEN "3: Yes: High Confidence". Other rules may be established for different types of agreements.

A number of rules may be established for each of the different types of facts analyzed by system 300. As new fact patterns are encountered (e.g., the first time an agreement having "Governing Law"="Portuguese") in agreements which are analyzed by system 300, a message may be generated to the user indicating that a new rule is needed to evaluate new fact pattern (e.g., the netting advice may indicate "NO: New Rule, Must Evaluate"). The user may then take the necessary steps to develop a new rule for the new fact pattern. For example, the user may perform legal research or other analyses needed to establish a rule to apply netting advice the next time an agreement with the new fact pattern is encountered.

Some rules may be established which depend on multiple facts of the agreement. For example, a rule may be established indicating that if the "Governing Law"="French" and if the "Industry Code"="French Bank" then the agreement can be netted with reasonable assurance. Other rules may be established which depend on multiple fact sets. Those skilled in the art will appreciate that other types of data may be provided to further define and apply rules.

Referring now to FIG. 7, a table represents an issue database 700 that may be stored at (or accessible by) netting system controller 400. The table includes entries identifying a number of different issues associated with particular counterparty agreements for which a netting determination is desired. These issues may be selected from a master set of issues defined by users of the system. For example, users (such as lawyers and/or system administrators) may periodically define, modify or otherwise update a set of issues which may be identified from fact information retrieved from counterparty agreements and which are useful in arriving at netting determinations.

The table also defines fields 702-716 for each of the entries. The fields specify: an agreement identifier 702, a sequence identifier 704, an issue number 706, an issue description 708, an issue netting determination 710, a terminator 712, a rule identifier 714 and comments 716.

Agreement identifier 702 may be the same as, or related to, the agreement identifier 502 of fact database 500 (FIG. 5). Agreement identifier 702 includes information identifying a particular counterparty agreement which is being analyzed. As depicted in the table of FIG. 7, the particular counterparty agreement which is being analyzed is identified by agreement identifier "A0001".

Sequence identifier 704 includes information identifying individual sequences of issues which have been presented and resolved for the agreement identified by agreement identifier 702. Each agreement may present a number of different issues, each of which are tracked and stored as separate sequences in database 700. In some embodiments, sequence identifier 704 may be alphanumeric information which is generated by netting system controller 100 as each issue in the sequence is dealt with. In some embodiments, each of the issues associated with a particular agreement are analyzed sequentially. The ultimate netting determination depends on each of the netting determinations for each issue (e.g., if the netting conclusion for each issue is that each issue can be netted with reasonable assurance, then the agreement can be netted; if the netting conclusions for some of the issues is that there can be no netting, the agreement may not be netted).

Issue number 706 includes information identifying particular issues which are identified in the agreement identified by agreement identifier 702. A description of the issue identified by issue number 706 is provided in issue description 708. Each counterparty agreement may have a number of issues. These issues are identified based on the existence or non-existence of particular facts in the agreement. For example, issue number "002" has an issue description of "DOES THE GOVERNING LAW SUPPORT NETTING IN THE CASE OF DEFAULT?" The existence of this particular issue in agreement "A0001" is determined based on the particular facts of the agreement (e.g., as contained in fact database 500).

Issue netting determination 710 includes information identifying whether parties can net for the issue identified by issue number 706 (which is determined, for example, by applying rules from rule database 600 to the particular fact pattern of the agreement). For example, for issue number "002", a determination has been made (e.g., based on rules established and stored in rule database 600, which were established by lawyers other individuals) that the answer is "YES: High Confidence" that parties can net for the issue. Each issue is associated with issue netting determination 710 indicating whether parties can net for the issue. The overall netting determination rendered by the system is based on the data in this field (e.g., if the determination is that parties cannot net for a particular issue, the netting agreement may be reevaluated, redrafted, or the like).

Terminator 712 includes information indicating whether the issue identified by issue number 706 is the last issue in the sequence. For example, for issue numbers "001"-"008", terminator 712 indicates that the issues were not the last issue in the sequence. As a result, the netting analysis continues after these issues are investigated. The netting analysis for agreement "A0001" finally reached a conclusion when issue "014" was reached and resolved (i.e., the terminator indicates that the issue is the last issue to be analyzed).

Rule 712 includes information identifying which rule or rule(s) were applied to identify or resolve the issue identified by issue number 706. Information in rule 712 corresponds to, or is based on, information in rule database 600. Comments 716 includes comment information which may be used to indicate whether the issue identified by issue number 706 was properly resolved, or if there are additional concerns or matters to address. Those skilled in the art will recognize that other data may also be provided in issue database 700.

Figure 8:
FIG. 8 is a tabular representation of a portion of a conclusion history database according to an embodiment of the present invention.

Referring now to FIG. 8, a table represents a conclusion history database 800 that may be stored at (or accessible by) netting system controller 400. The table includes entries identifying netting determinations or netting conclusion histories for a number of different counterparty agreements which have been analyzed using techniques of the present invention. Some or all of this information may be transmitted from netting system controller 400 to other systems, such as counterparty system 30, entity master system 40, credit agreement system 50, or FASB system 60.

The table also defines fields 802-818 for each of the entries. The fields specify: a record identifier 802, an agreement identifier 804, an entity name 806, a counterparty 808, a netting advice 810, an update field 812, an override 814, counterparty FASB information 816, and counterparty credit information 818.

Record identifier 802 includes information identifying a particular agreement record stored in database 800. This information may be, for example, automatically assigned as each new agreement netting analysis is performed. Agreement identifier 804 may be the same as, or related to, the agreement identifier 502 of fact database 500 (FIG. 5). Agreement identifier 804 includes information identifying a particular counterparty agreement which is being analyzed.

Entity name 806 includes information indicating the contracting entity associated with the agreement identified by agreement identifier 804. This information is typically retrieved from counterparty system 30 and represents a fact regarding the agreement. Similarly, counterparty 808 includes information indicating the contracting counterparty associated with the agreement identified by agreement identifier 804. This information may also be retrieved from counterparty system 30 and represent a fact regarding the agreement.

Netting advice 810 includes information indicating the overall netting advice which has been arrived at as a result of the netting analysis performed by netting system controller 400. A variety of different types of netting advice may be provided, including, for example "YES: Reasonable Assurance" (indicating that the netting arrangement is approved with reasonable assurances), "YES: High Confidence" (indicating that the netting arrangement is approved with high confidence), etc.

Update 812 includes information indicating whether facts from the agreement require further update or follow-up (e.g., to attain a passing netting advice). Override advice 814 includes information indicating whether a manual override was performed to arrive at the netting determination. For example, in some embodiments, a lawyer or other individual operating client device 10 may be allowed to perform manual overrides of netting determinations rendered by netting system controller 400. Counterparty FASB 816 and counterparty credit 818 include information indicating whether particular types of netting may be accomplished for the agreement identified by agreement identifier 804 (e.g., an entity may establish different ultimate netting rules for FASB netting versus counterparty credit netting). If an agreement can be netted, than information in other databases may be updated accordingly. For example, if analysis of a particular agreement indicates that it can be netted for FASB as well as for counterparty credit, than databases tracking net FASB and net credit positions with respect to the counterparty are updated based on the FASB and credit amounts associated with the particular agreement. The result is a system which allows an entity to quickly, accurately, and efficiently track and update net positions with a number of different counterpartys and for a number of different counterparty agreements.

Process Description

Figure 9:
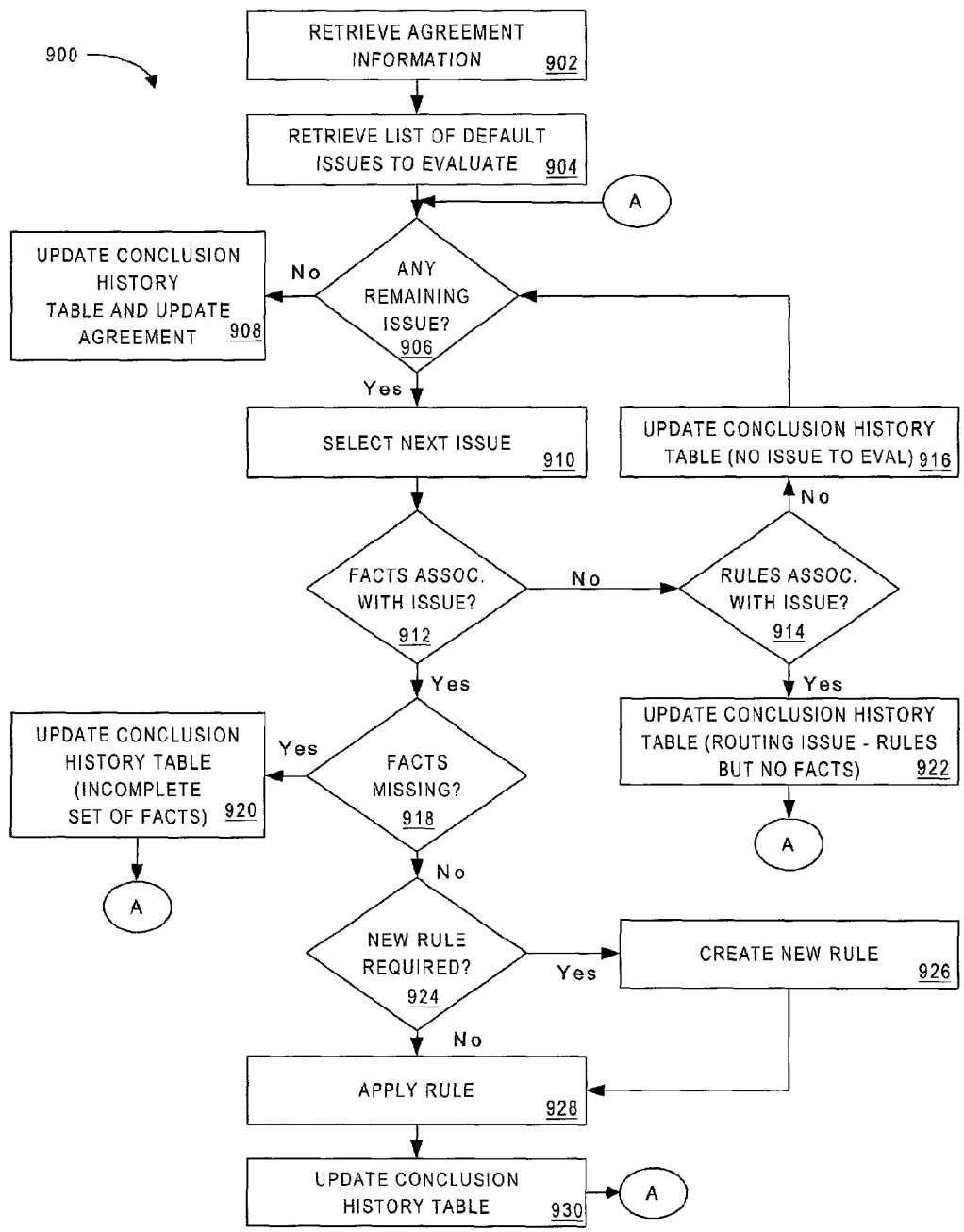
FIG. 9 is a flow chart of a method for agreement netting analysis associated with an agreement netting system according to some embodiments of the present invention.

Reference is now made to FIG. 9, where a flow chart 900 is shown which represents the operation of an embodiment of the present invention. The particular arrangement of elements in the flow chart of FIG. 9 is not meant to imply a fixed order to the steps; embodiments of the present invention can be practiced in any order that is practicable. The process represented by flow chart 900 may be performed, for example, by netting system controller 400 in conjunction with other devices, such as client device 10, etc. In some embodiments, the process may be performed on a regular basis, depending on the frequency with which counterparty agreements change at the entity desiring netting determinations. In some embodiments, the process may be performed each time a sufficient number of counterparty agreements have been created or modified which require a netting determination. The process may be performed on other schedules as well.

The process begins at 902 where agreement information is retrieved. In some embodiments, each counterparty is evaluated sequentially. That is, if multiple counterparty agreements are to be analyzed, each will be analyzed on its own before the next is analyzed. In some embodiments, agreement information retrieved at 902 includes counterparty agreement information. In some embodiments, the counterparty agreement information is retrieved from a counterparty agreement repository such as counterparty system 30 (FIG. 3). Information retrieved at 902 may include, for example, a number of facts about the agreement (e.g., including facts such as those identified in fact database 500). In other embodiments, a netting analysis may be performed on agreement data entered in a session by a user operating client device 10.

Processing continues at 904 where a list of default issues to evaluate is retrieved. In some embodiments, netting system controller 400 may store and maintain a listing of current default issues which are evaluated to arrive at a netting determination on counterparty agreements. This default issue list may vary based on the type of counterparty agreement received, for example. In some embodiments, a user operating client device may edit the default list to add or remove default issues to be evaluated for a particular counterparty agreement or agreements.

Processing continues at 906 where a determination is made whether any issues remain. In the first pass, the answer will typically be "YES" and processing will continue at 910 where the next (or in the case of the first pass, the first) issue will be selected for processing.

Processing continues at 912 where a determination is made whether there are any facts associated with the current issue. As an example, and referring to FIGS. 5 and 7, if the issue being evaluated is issue number "002" ("DOES THE GOVERNING LAW SUPPORT NETTING IN THE CASE OF DEFAULT?"), the relevant fact needed is fact "002" ("GOVERNING LAW"). Thus, the answer to the query at 912 is "YES", a fact is needed to evaluate the particular issue in question.

Processing continues to 918 where a determination is made whether the counterparty agreement being evaluate possesses data corresponding to the required fact. In the case of agreement "A0001", the determination at 918 is "NO" there are no facts missing in the agreement associated with the issue. In agreement "A0001", the governing law is "ENGLISH". Processing thus passes to 924.

At 924 a determination is made whether any new rule is required to properly evaluate the issue. This determination is made based on the particular fact associated with the relevant agreement. For example, in agreement "A0001", the value of the fact associated with the current issue is "ENGLISH". Thus, the determination at 924 depends on whether a rule is associated with the fact value "ENGLISH" for the issue of "DOES THE GOVERNING LAW SUPPORT NETTING IN THE CASE OF DEFAULT?". In some cases, a rule may not yet have been established for a particular fact value. In other cases, such as in the present example, a rule has been established and processing continues at 928 and the rule is applied. In the example, application of the rule leads to a conclusion of "3: YES: High Confidence" that a fact value of "ENGLISH" for the issue of "DOES THE GOVERNING LAW SUPPORT NETTING IN THE CASE OF DEFAULT?" will allow netting. This conclusion is used to update information in a conclusion history table stored at or accessible to netting system controller 400. The conclusion may also be stored in agreement database 700 (FIG. 7).

Processing then reverts back to 906 where a determination is made whether any issues remain to be evaluated. If issues remain, processing repeats as described. If no issues remain, processing continues to 908 where the conclusion history table is updated to indicate that the netting analysis has been completed. Information may also be transmitted to other systems, such as counterparty system 30, to update netting information stored and used in those systems.

If processing at 912 indicates that there are no facts associated with a particular issue that is being evaluated, processing continues to 914 where a determination is made whether any rules are associated with the issue and the particular facts of the counterparty agreement. In some situations, a particular fact set for an issue does not have any rules associated with it. In such a situation, processing continues to 916 where the conclusion history table is updated to indicate such.

If processing indicates that one or more rules are associated with the issue, processing continues at 922 where the conclusion history table is updated to indicate that the issue was simply a routing issue having rules, but no facts. Processing then reverts to 906 to determine if further issues require evaluation.

If processing at 924 indicates that a new rule is required, processing continues to 926 where a new rule is created. For example, this may occur in situations where a fact pattern is encountered for the first time. As an example, if a counterparty agreement is analyzed which uses the governing law of "AZERBAIJAN" (and if this is the first time that the system has encountered such a fact pattern) a new rule may need to be established at 926. The new rule may be established by, for example, an authorized user of client device 10 interacting with controller 400.

In some embodiments, a new rule may only be created by specifically-authorized individuals (e.g., lawyers having responsibility for the system, etc.). In some embodiments, establishment of a new rule may also require the presentation of proof of the accuracy of the rule. For example, a new rule may be established based on a written opinion of qualified counsel. This written opinion may be stored in the system and associated with the rule at 926. In some embodiments, validity dates for the rule may also be established at 926. As a result, netting system controller 400 is able to continue to learn and develop new rules as new fact patterns and issues are encountered. Once the new rule is created, processing continues at 928 where the new rule is applied. In some embodiments, before the new rule is applied, processing may include an evaluation step where the new rule is evaluated by a system operator or other user prior to use of the new rule. For example, in some embodiments, a conclusion table may be updated to indicate that the rule is a "New Rule" and that it must be evaluated prior to arriving at a final netting determination.

This overall process repeats until all issues relating to a counterparty agreement are analyzed. Upon completion of the analysis, an overall netting determination is made. Further, if the system determines that the parties can net as contemplated in the agreement, net positions between the parties may be updated based on the terms of the agreement by providing netting information to systems such as credit agreement system 50 (to track credit netting data) or FASB agreement system 60 (to track FASB netting data). Data may also be written to counterparty system 30 to indicate which agreements in the system have been analyzed.

Pursuant to some embodiments, agreements may be re-analyzed on a scheduled basis to determine if the netting arrangements continue to be valid. Although the present invention has been described with respect to a preferred embodiment thereof, those skilled in the art will note that various substitutions may be made to those embodiments described herein without departing from the spirit and scope of the present invention. For example, although embodiments of the present invention have been described as allowing the updating of netting databases such as FASB and credit databases, other netting information may also be updated, such as, for example, CAD databases or the like.

What is claimed is:

1. A processor-implemented method for performing a netting analysis of an agreement, the method comprising:
   receiving, via a processor, agreement information via a communications network;
   retrieving, from said agreement information, a party identifier a counterparty identifier, at least a first issue and first issue agreement information associated with the at least first issue;
   establishing, via a processor, at least one netting rule by training a netting decision engine;
   analyzing said agreement by comparing, via a processor, said agreement information with the at least one netting rule; and
   generating, via a processor, a netting determination indicative of an ability of the party and counterparty to net under said agreement based at least in part on a result of said analyzing, wherein said netting determination includes a qualification of said agreement and a level of confidence indicative of enforceability, wherein the level of confidence is retrieved from a rule database based on an outcome of a rule application.

2. The method of claim 1, further comprising:
   identifying a list of issues to evaluate for said agreement.

3. The method of claim 2, wherein said netting rule is selected based at least in part on a first issue and said agreement information.

4. The method of claim 1, further comprising:
   forwarding said netting determination to an agreement database.

5. The method of claim 1, further comprising:
   forwarding said netting determination to a credit database; and
   updating a net credit amount associated with said counterparty and said party in said credit database.

6. The method of claim 1, further comprising:
   forwarding said netting determination to a Financial Accounting Standards Board database; and
   updating a netting amount associated with said counterparty and said party in said Financial Accounting Standards Board database.

7. The method of claim 1, wherein said agreement information further includes at least one of:
a form of agreement;
a governing law;
a country of organization;
a state or province of organization;
a legal structure;
an industry code;
automatic early termination language;
a parent company country of organization;
a parent company legal structure; and
an automatic early termination payment.

8. The method of claim 6,
wherein said at least one netting rule is associated with said at least first issue and identified at least in part on said agreement information; and further comprising:
applying said at least one netting rule to said agreement information to arrive at a netting determination for said at least first issue.

9. A processor-implemented method for performing a netting analysis of an agreement, the method comprising:
receiving, via a processor, fact data associated with said agreement via a communications network;
retrieving, from said fact data, a contracting entity identifier, a counterparty identifier;
identifying, via a processor, a default set of issues associated with said agreement;
identifying, via a processor, first issue fact data associated with a first issue;
establishing, via a processor, at least one netting rule by training a netting decision engine;
analyzing said agreement by applying, via a processor, the netting rule to said first issue fact data, said netting rule selected based at least in part on said first issue; and
generating, via a processor, a netting determination based at least in part on said analyzing and indicative of an ability of the contracting entity and counterparty to net under said agreement, wherein said netting determination includes a qualification of said agreement and a level of confidence indicative of enforceability, wherein the level of confidence is retrieved from a rule database based on an outcome of the rule application.

10. The method of claim 9, further comprising:
identifying second issue fact data associated with a second issue;
applying a second netting rule to said second issue fact data, said second netting rule selected based at least in part on said second issue; and
generating a netting determination based at least in part on said application of said netting rule and said second netting rule.

11. The method of claim 10, further comprising:
identifying third issue fact data associated with a third issue;
establishing a new netting rule based at least in part on said third issue fact data and said third issue;
applying said new netting rule to said fact data;
generating a netting determination based at least in part on said application of said netting rule and said new netting rule.

12. The method of claim 9, further comprising:
calculating a new netting position between said contracting entity and said counterparty based on said agreement and a prior netting position.

13. The method of claim 12, further comprising:
updating a credit database based on said new netting position.

14. The method of claim 12, further comprising:
updating a Financial Accounting Standards Board database based on said new netting position.

15. An apparatus for performing netting analysis of counterparty agreements, comprising:
a processor;
a communications device in communication with said processor, receiving counterparty agreement data; and
a memory unit in communication with said processor and storing a program, wherein the processor is operative with said program to:
receive counterparty agreement data via a communications network;
retrieve, from said counterparty agreement data, a party identifier and a counterparty identifier, wherein the counterparty identifier identifies a counterparty to said counterparty agreement;
retrieve at least one issue and agreement information associated with the at least one issue;
establish, via a processor, at least one netting rule by training a netting decision engine;
analyze said agreement by comparing said counterparty agreement data with the netting rule; and
generate a netting determination for said counterparty agreement based at least in part on a result of said analyzing and indicative of an ability of the party and counterparty to net under said counterparty agreement, wherein said netting determination includes a qualification of said agreement and a level of confidence indicative of enforceability, wherein the level of confidence is retrieved from a rule database based on an outcome of the rule application.

* * * * *